March 20, 1962 S. LEVEN 3,025,918
PIPE STORAGE AND HANDLING DEVICE
Filed Jan. 7, 1954 4 Sheets-Sheet 1

Inventor:
Samuel Leven.
by Charles F. Osgood,
attorney.

March 20, 1962 S. LEVEN 3,025,918
PIPE STORAGE AND HANDLING DEVICE
Filed Jan. 7, 1954 4 Sheets-Sheet 2

Inventor:
Samuel Leven.
by Charles F. Osgood,
attorney.

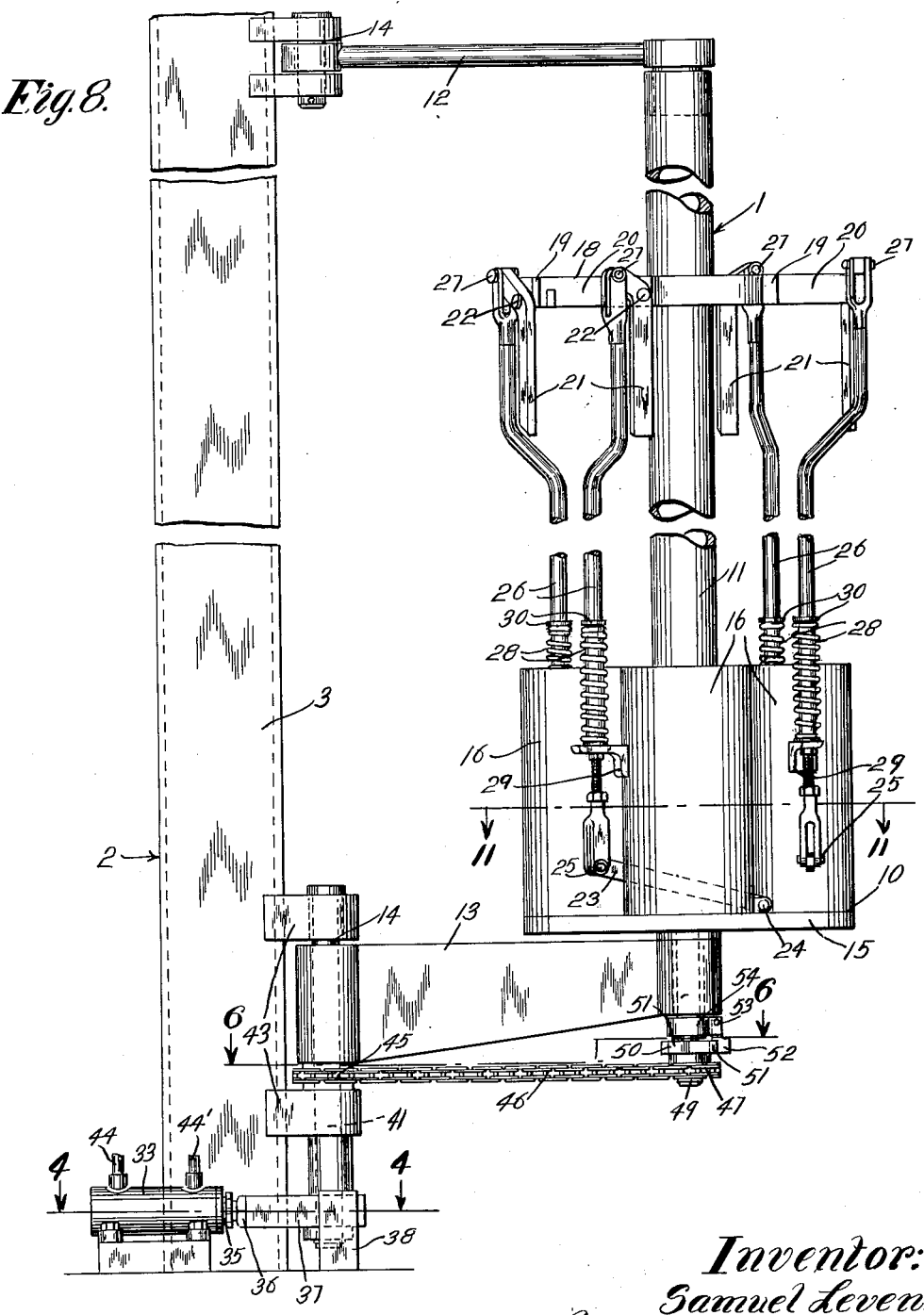

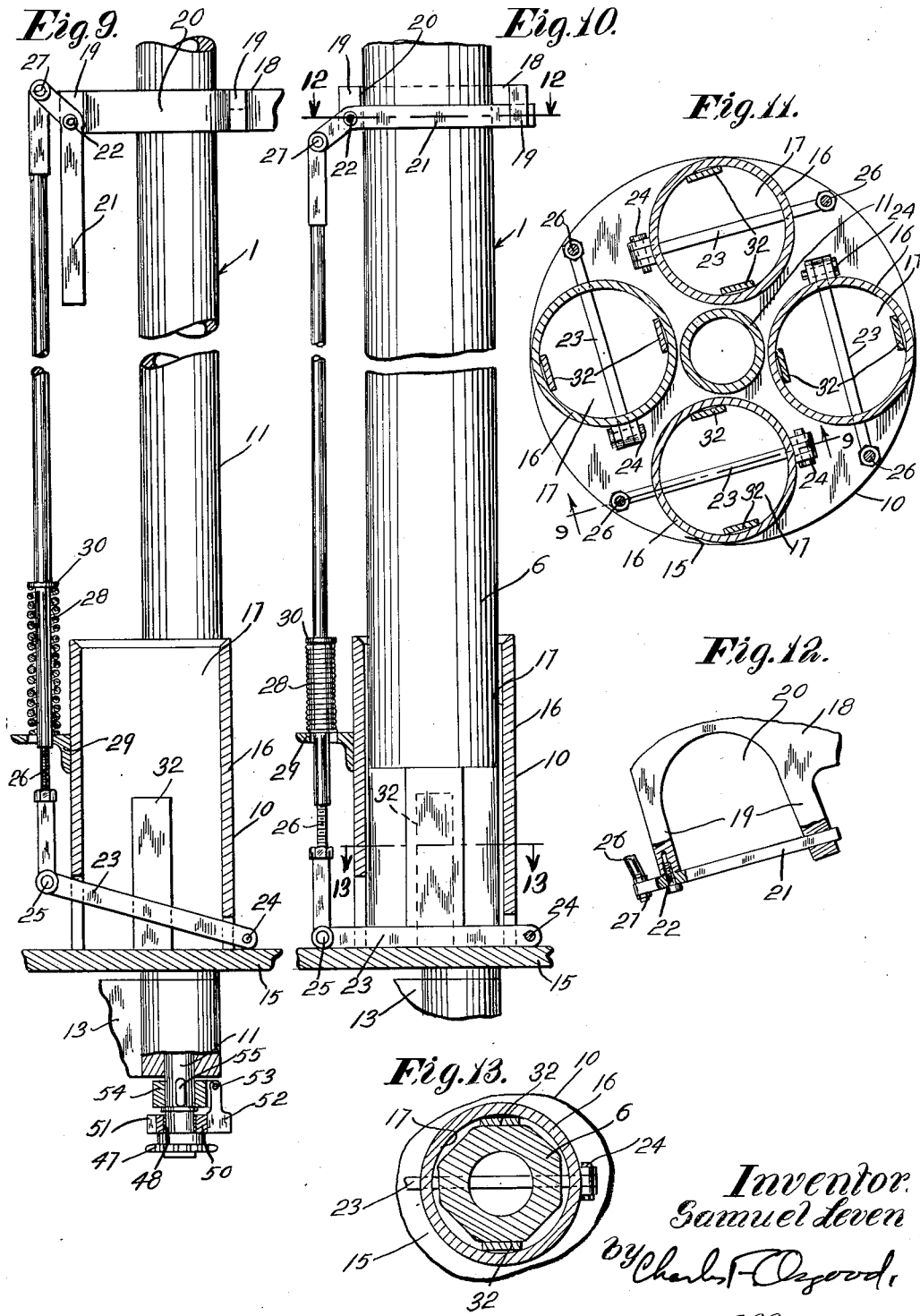

United States Patent Office 3,025,918
Patented Mar. 20, 1962

3,025,918
PIPE STORAGE AND HANDLING DEVICE
Samuel Leven, Michigan City, Ind., assignor to Joy Manufacturing Company, Pittsburgh, Pa., a corporation of Pennsylvania
Filed Jan. 7, 1954, Ser. No. 402,768
3 Claims. (Cl. 175—52)

This invention relates to a pipe storage and handling device for the drill pipe sections or rods of a rotary drilling apparatus whereby the pipe or rod sections may be stored and readily and quickly handled.

In a conventional rotary drilling apparatus as, for example, a rotary blast hole drill, there is usually provided a rotation mechanism for rotating the drill string or pipe line which is made up of a series of pipe or rod sections coupled together. As the drill hole deepens during drilling, additional pipe or rod sections are added to the upper end of the pipe line and during withdrawal of the pipe line from the hole the pipe sections are successively uncoupled, and the pipe sections or stands of pipe are stored in a suitable manner, usually within the derrick, both going into and coming out of the hole. The drilling apparatus has a usual hoisting mechanism which has its cable attachable to upper ends of the pipe sections for handling the latter during transfer and storing thereof, and there is a usual slip bowl containing slips for holding the pipe line against downward movement during the addition and removal of pipe sections. The usual hoisting cable and the drill feed are employed for handling drill pipe sections and for lowering and raising the pipe line, and it has been found difficult, time consuming and extremely laborious to transfer the pipe sections to and from their stored positions and to move the pipe sections out of or to bring the same into alignment with the hole. Known types of apparatus have employed rotary racks associated with a drilling apparatus for receiving, supporting and storing the pipe or rod sections and this rotary rack is also employed to move the pipe sections laterally into and out of alignment with the hole, and the present invention contemplates improvements over such known types of pipe storage and handling equipment in that the handling of the pipe sections is made more rapid and efficient.

An object of the present invention is to provide an improved pipe storage and handling device. Another object is to provide an improved power actuated pipe storage and handling device especially designed for use with a rotary drilling apparatus. Yet another object is to provide an improved rotary rack device for receiving a number of drill pipe sections or stands for storing the section and having improved means for moving the rotary rack laterally to positions to bring the stands of drill pipe successively into alignment with the hole being drilled so that the pipe sections may be readily coupled to or uncoupled from the pipe line. Yet another object is to provide an improved pipe storage rack having improved automatic indexing means whereby when the rack is moved laterally in one direction it has a partial rotation imparted thereto to effect proper positioning of the pipe section. A still further object is to provide improved means for holding the pipe sections in stored position on the rotary rack. Yet another object is to provide an improved rotary rack device for drill pipe stands and having sockets for receiving the lower ends of the pipe sections and improved means for preventing turning of the pipe sections in the sockets whereby the pipe section is held against rotation during attachment of the rotating mechanism of the drilling mechanism thereto. These and other objects and advantages of the invention will, however, hereinafter more fully appear.

In the accompanying drawings there is shown for purposes of illustration one form which the invention may assume in practice.

In these drawings:

FIG. 8 is an enlarged side elevational view of the pipe storage and handling device.

FIG. 9 is an enlarged vertical section taken on line 9—9 of FIG. 11, with the latch released and showing details of the indexing means.

FIG. 10 is a view similar to FIG. 9 showing a pipe section in supported position on the rotary rack, with the pipe latch held in closed position.

FIG. 11 is a horizontal section taken on line 11—11 of FIG. 8.

FIG. 12 is a horizontal section taken on line 12—12 of FIG. 10, showing details of a pipe latch.

FIG. 13 is a hoizontal section taken on line 13—13 of FIG. 10, showing a bottom socket with the lower end of a drill pipe in position therein.

Figure 1:
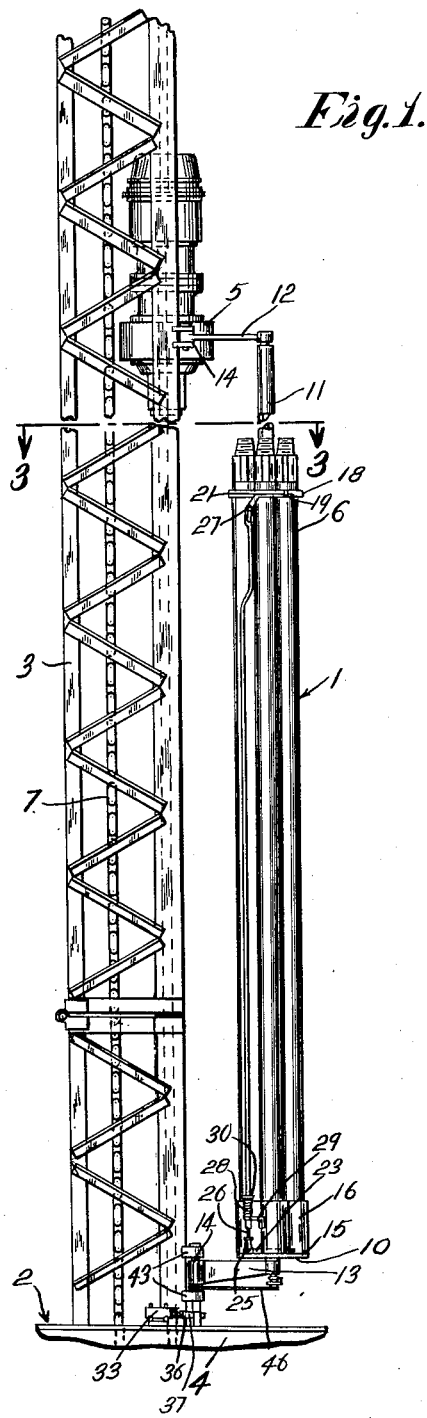
FIG. 1 is a side elevational view showing the improved pipe storage and handling device in association with a rotary drilling apparatus.
Figure 2:
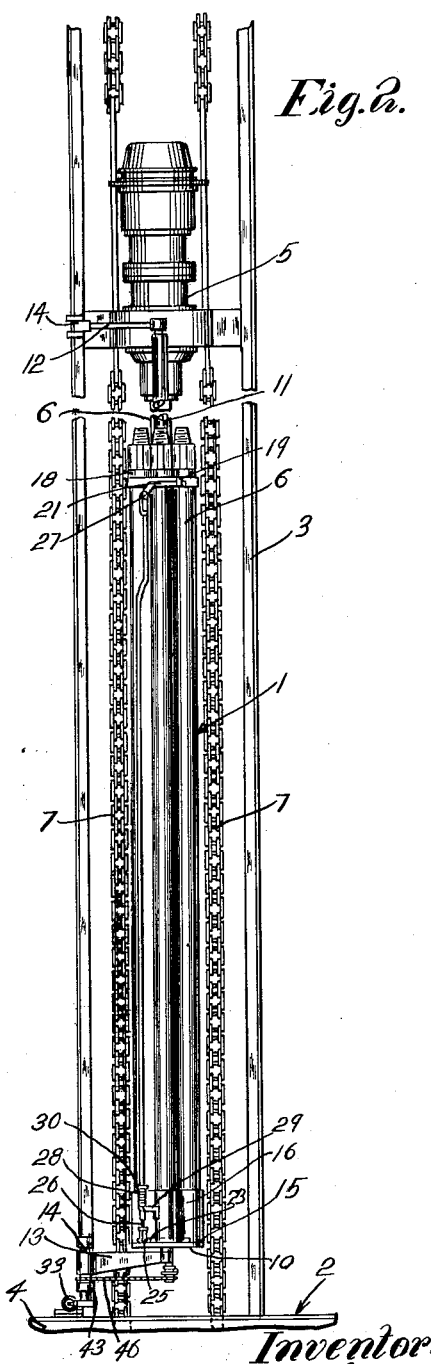
FIG. 2 is a front elevational view of the pipe storage and handling device and associated drilling apparatus shown in FIG. 1, with the rotary rack swung horizontally through 90° into its position wherein a pipe section is disposed in alignment with the drill hole.

The improved pipe storage and handling device is generally designated 1 and is shown in association with a rotary drilling apparatus generally designated 2. The drilling apparatus may assume various forms but is herein, for illustrative purposes, in a form of a rotary blast hole drill comprising a vertical derrick or mast structure 3 mounted on a mobile base 4.

Guided for movement vertically along the derrick or mast structure is a drill rotating mechanism 5 for rotating a drill pipe or rod line 6. Motor actuated feed chains 7 suitably guided for circulation relative to the derrick or mast structure serve to move the rotating mechanism 5 up and down along the derrick or mast guideways to feed the pipe line into the hole during drilling, for raising the pipe line from the hole, and for raising and lowering the pipe sections relative to the storage and handling device. The pipe or rod line is made up of a series of elongated pipe or rod sections coupled together, as by threaded tool joints, and as the hole deepens during drilling, pipe or rod sections may be added to the upper end of the pipe or rod line and, conversely, during the raising of the pipe line from the hole the pipe sections may be successively detached from the upper end of the pipe line and the stand of the detached pipe sections be suitably transferred to one side and stored within the drilling apparatus, in a well known manner.

The improved pipe storage and handling device 1 includes a rotary rack 10 journaled for rotation about a vertical axis on a vertical shaft 11 carried by top and bottom pivoted brackets or swingable armlike supports 12 and 13 pivotally mounted at 14 on the adjacent side of the derrick or mast structure. A bottom turntable 15 is located just above the bottom support 13 and provided with socketed or cuplike members 16 having sockets 17 for receiving the lower ends of the pipe sections for a purpose later to be described. An upper rotatable support member 18 has pairs of spaced arms or fingers 19 which provide radially spaced recesses 20 opening outwardly to receive the upper end portions of the pipe sections. The stands of drill pipe or pipe sections are receivable by the rotary rack with the lower ends of the pipe sections located in the sockets of the bottom turntable and the upper end portions of the pipe sections received in the top recesses and the pipe sections may be locked in position on the rotary rack by any suitable means such as latches 21, the latter being pivoted at 22 on certain of the fingers 19 of the upper support member 18. Bottom levers 23 are pivoted at 24 on the bottom turntable and these levers extend through openings in the walls of the socketed members across the sockets as shown and are pivotally connected at their outer ends at 25 to upright rods 26 extending longitudinally along the outer sides of the rotary rack. These rods 26 are pivotally connected at 27 to the latches 21. Springs 28 encircle the rods and are arranged between brackets 29 on the outer walls of the socketed member and collars 30 secured to the rods, constantly to urge the latter in an upward direction tending to maintain the latches 21 in depressed released position. When the lower ends of the pipe sections are inserted in the sockets of the bottom turntable they engage the levers 23 and the weight of the pipe sections depresses the levers 23 causing the rods 26 to move downwardly thereby to swing the latches 21 upwardly into locking position as shown in FIG. 10. When the pipe sections are raised from the sockets their weight is removed from the bottom levers 23 so that the springs 28 automatically move the latches 21 into released position (FIG. 9).

The drill pipe or rod sections are desirably of polygonal cross section at their end portions at the tool joints (FIGS. 1, 2, 10 and 13) and the sockets 17 have abutment plates 32 engaging opposite flat sides of the polygonal pipe portions for holding each pipe section against rotation in its socket during attachment and removal of the rotating mechanism 5 to and from the upper end of the pipe section.

Figure 3:
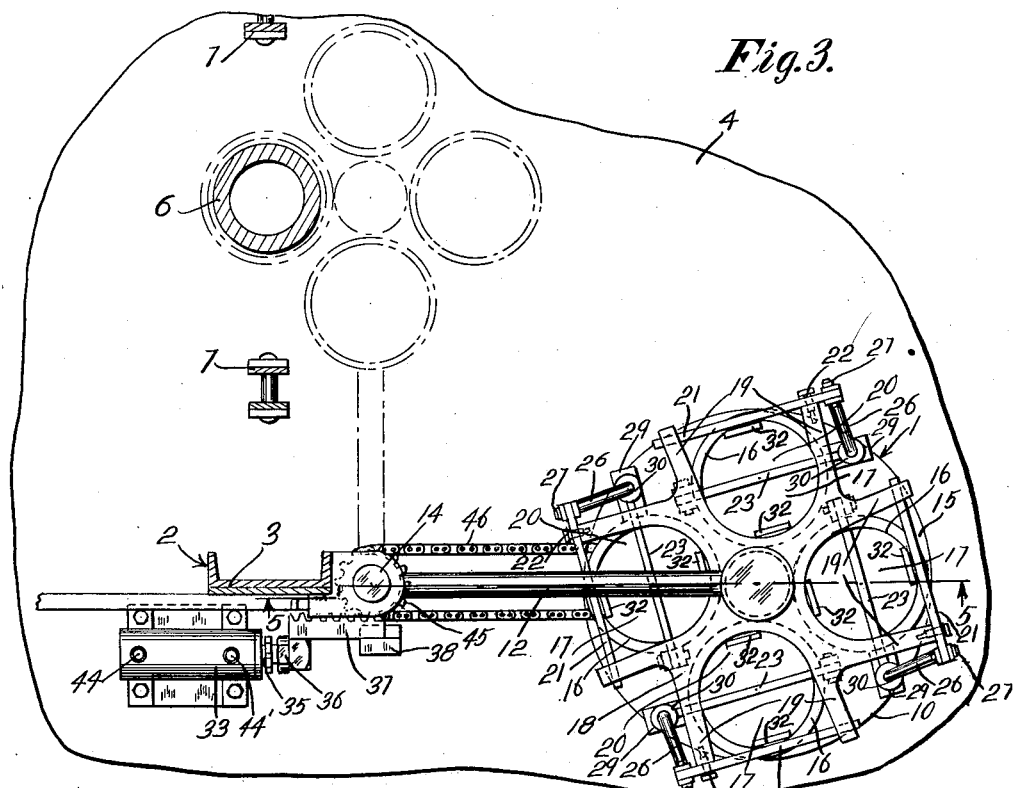
FIG. 3 is an enlarged horizontal sectional view taken on line 3—3 of FIG. 1, showing details of the pipe storage and handling device.
Figure 4:
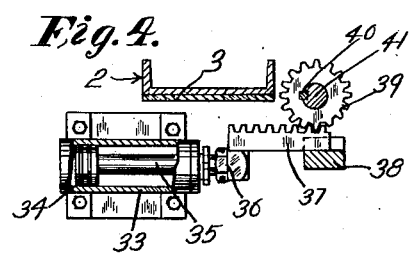
FIG. 4 is a detail horizontal section taken on line 4—4 of FIG. 8.
Figure 5:
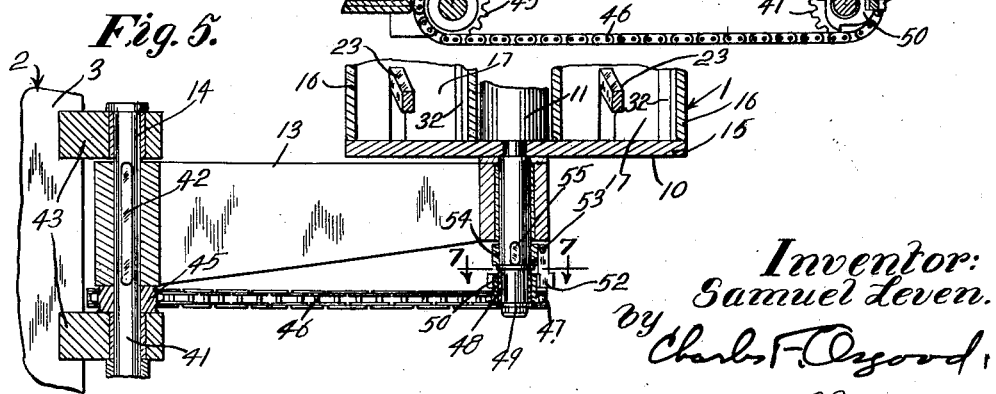
FIG. 5 is a fragmentary vertical section taken on line 5—5 of FIG. 3.

The swinging means for the armlike supports 12, 13 for the rotary rack comprises a horizontal fluid cylinder 33 mounted on the base at one side of the derrick or mast structure and containing a reciprocable piston 34 (FIG. 4) having its piston rod 35 extending outwardly from the cylinder and secured at 36 to a slidable rack bar 37 suitably guided in a guide block 38. The teeth of this rack bar mesh with the teeth of a spur gear 39 keyed at 40 to a vertical shaft 41, the latter in turn being keyed at 42 to the lower armlike support 13 (FIG. 5). This vertical shaft is suitably journaled in bearings carried within bearing brackets 43 secured to the derrick or mast structure so that the shaft provides a pivotal mounting for the lower armlike support. Conduits 44 and 44' lead from a suitable source of fluid under pressure to the opposite ends of the bore of the cylinder 33 and flow through these conduits may be controlled by a suitable valve device (not shown) so that the piston may be moved selectively in either direction at will. Thus it will be evident that the rotary pipe rack may be swung horizontally through substantially 90° between the full and dotted line positions shown in FIG. 3, and when the rotary rack is in the dotted line position shown, one of the pipe sections carried thereby is located in alignment with the hole being drilled.

Figure 7:
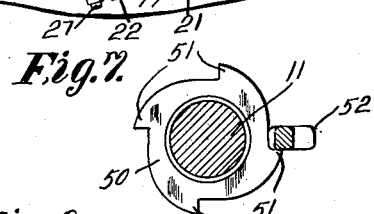
FIG. 7 is an enlarged detail section taken on line 7—7 of FIG. 5, showing the ratchet and pawl of the indexing means.
Figure 6:
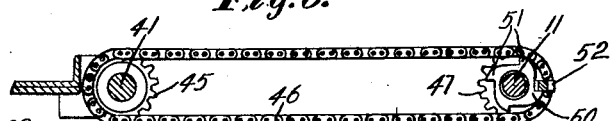
FIG. 6 is a horizontal section taken on line 6—6 of FIG. 8.

Improved indexing means is provided for automatically turning the rotary rack through 90° each time it is swung horizontally from its position over the hole so that a pipe section is always located in position for attachment to the pipe line when it is swung back into alignment with the hole. Conversely when the rack is swung laterally toward the dotted line position shown in FIG. 3 the rotary rack is disconnected from its rotating means and remains stationary as regards turning on its own axis during such movement. This automatic indexing means comprising a chain sprocket 45 secured, as by welding, to the adjacent bearing bracket 43, and an endless chain 46 passes around the sprocket and engages a chain sprocket 47 journaled on a bearing sleeve 48 supported by a bottom projection 49 of the vertical rack-shaft 11. Formed integral with the hub of the sprocket 47 is a ratchet 50 having four camlike projections 51 engaged by a pawl 52, the latter being pivoted at 53 on a collar 54 keyed at 55 to the shaft-projection 49. Thus as the rotary rack is swung horizontally from the full line position shown in FIG. 3 to the dotted line position in that figure the chain 46 engaging the stationary sprocket 45 acts as a parallel motion connection and causes the sprocket 47 to turn freely on its bearing mounting thereby turning the ratchet (FIG. 7) in a clockwise direction with the pawl slipping over the cam projections 51 as the ratchet revolves. Thus as the rotary rack swings into its position to bring a pipe section into alignment with the hole being drilled, the rotary rack remains stationary as regards rotation about its own axis. When the rotary rack is swung from the dotted line position shown in FIG. 3 to the full line position shown in the figure the chain 46 which acts as a parallel motion connection causes the sprocket 47 to rotate in a counter clockwise direction, thereby effecting engagement of the ratchet with the pawl 52 so that the rotary rack is given a partial rotation through 90° about its own axis to bring a pipe section thereon into proper position for movement into alignment with the hole. When the rotating mechanism 5 of the drilling apparatus is attached to the upper pipe section it may be fed along the derrick or mast guideways by the feed chains 7 to lower the pipe section at a socket of the rotary rack or to raise a pipe section from the rotary rack socket. Since the mode of operation of a drilling apparatus of the type disclosed is well known to those skilled in the art, further description of its operation is deemed unnecessary.

As a result of this invention an improved pipe storage and handling device is provided which is built into a drilling apparatus and is power actuated to permit the speedy and easy handling of drill pipe stands. By the provision of the improved power operated swinging means for the rotary pipe rack mounting and the associated power indexing means for the rotary rack, the latter may be quickly swung horizontally into and out of a position wherein a pipe section is disposed in alignment with the hole being drilled and the rotary rack during such swinging movement in one direction has a partial rotation imparted thereto properly to index the drill pipe on the rack. The improved pipe storage and handling device is of a relatively simple and rugged design, well adapted for its intended purpose, and may be readily associated with a conventional drilling apparatus with a minimum of change. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an apparatus for handling drill pipe at a well hole, the combination of: a ground-supported base; a horizontal frame shiftably supported by the base for horizontal movement relative thereto; a rack shiftably supported by the horizontal frame and adapted to support a plurality of drill pipes in horizontally-spaced vertical positions, for storing and sorting said drill pipes, and for horizontal movement relative to said horizontal frame to shift a selected drill pipe into and out of alignment with the well hole; a vertical traverse frame shiftably supported by the base for vertical movement relative thereto along the axis of the well hole; a rotary-drive unit supported by the vertical traverse frame for vertical movement therewith along the axis of the well hole, said rotary-drive unit being adapted to have supporting and rotary driving engagement with a selected dirll pipe aligned on the rack with said axis to rotate said pipe about said axis, and being engageable and disengageable from said selected drill pipe by rotation relative thereto about said axis under power of said rotary-drive unit; means on said rack engaging the drill pipe for positively holding said drill pipe against rotation in either direction about its longitudinal axis relative to said rack during such engagement with and disengagement of said rotary-drive unit with respect thereto, and power means connected to the vertical traverse frame to power-raise and power-lower the vertical traverse frame to raise said selected drill pipe from the rack, and thereafter, when the rack and the horizontal frame are shifted out of alignment with the well hole, to power-lower said selected drill pipe for rotary drilling under power of said rotary-drive unit.

2. In a well-drilling apparatus having a ground-supported base; a derrick supported by said base; a drill tool; a plurality of vertically-disposed drill pipes adapted to be detachably connected end to end into a string, said string connected at its lowermost end to said drill tool; the combination of a horizontal rack for storing and sorting said drill pipes, a horizontal swing frame supporting said rack for rotation of said rack relative thereto about a first vertical axis; means supporting said swing frame on said base for swinging said frame about a second vertical axis to move said rack into and out of position over the drilling axis; and reversible power means operatively connected to said swing frame for swinging the latter in either of opposite directions and operable to swing said swing frame in one direction about said second vertical axis and simultaneously, as a result of such swinging motion, to rotate said rack about said first vertical axis while positively precluding reverse rotation of said rack during swinging of said swing frame in the opposite direction, said power means embodying an automatic unidirectional drive having a one-way slip device for effecting such rotation of said rack.

3. A well-drilling apparatus as set forth in claim 2 wherein said power means comprising a reversible swinging motor having operator controllable control means and said one-way slip device for precluding reverse rotation of said rack relative to said swing frame while permitting free opposite rotation comprises a ratchet and pawl device connected between said swing frame and said rack and adapted automatically to slip upon swinging of said swing frame in said one direction.

References Cited in the file of this patent

UNITED STATES PATENTS

| | | |
|---|---|---|
| 285,388 | Butterfield | Sept. 25, 1883 |
| 1,144,229 | Mueller | June 22, 1915 |
| 1,288,351 | Wood | Dec. 17, 1918 |
| 1,595,652 | Fritts | Aug. 10, 1926 |
| 1,719,283 | Zeller | July 2, 1929 |
| 1,786,608 | Halstead | Dec. 30, 1930 |
| 2,081,580 | Diffenderfer | May 25, 1937 |
| 2,096,264 | Schutz | Oct. 19, 1937 |
| 2,423,169 | Bennett | July 1, 1947 |
| 2,683,538 | Kingston et al. | July 13, 1954 |
| 2,972,388 | Thornburg | Feb. 21, 1961 |